United States Patent [19]

Evans

[11] 4,342,997
[45] Aug. 3, 1982

[54] ARRAY MODIFICATION THAT ADDS HEIGHT CAPABILITY TO A 2D ARRAY RADAR

[75] Inventor: Gary E. Evans, Trappe, Md.

[73] Assignee: Westinghouse Electric Corp., Pittsburgh, Pa.

[21] Appl. No.: 165,830

[22] Filed: Jul. 3, 1980

[51] Int. Cl.³ .............................................. G01S 3/46
[52] U.S. Cl. .............................. 343/16 R; 343/100 R; 343/853
[58] Field of Search ................. 343/16 R, 100 R, 853

[56] References Cited

U.S. PATENT DOCUMENTS 3,448,450 6/1969 Alfandari et al. ................. 343/16 R
3,495,249 2/1970 Downie ........................ 343/16 R X
3,964,067 6/1976 Lucas ............................. 343/853 X Primary Examiner—T. H. Tubbesing
Attorney, Agent, or Firm—W. E. Zitelli

[57] ABSTRACT

A two-dimensional (2D) radar antenna system includes a combination of power divider networks coupled together to drive an array of antenna elements to form two beams in different directions spatially. The power divider networks, in combination, have characteristics which effect power concentrations of the two formed beams at different locations in the array without significant loss of illuminating power. As a result, the two formed beams render both amplitude and phase angle difference signals with respect to a common detected target which may be used to accurately and uniquely measure the elevation of the target.

10 Claims, 10 Drawing Figures

U.S. Patent  Aug. 3, 1982  Sheet 1 of 6  4,342,997
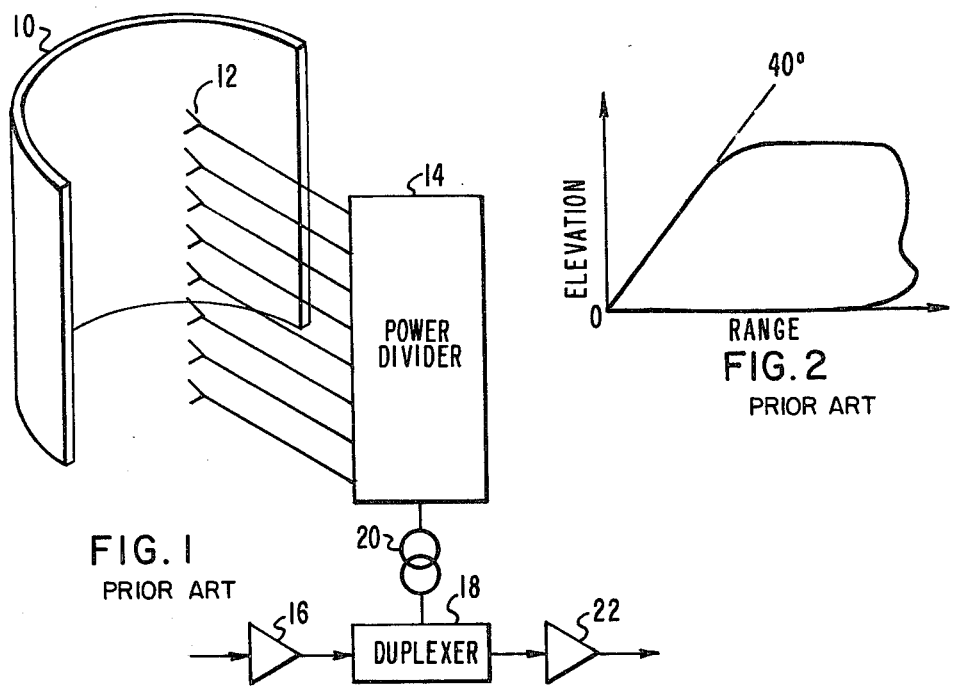
FIG. 1 PRIOR ART
FIG. 2 PRIOR ART
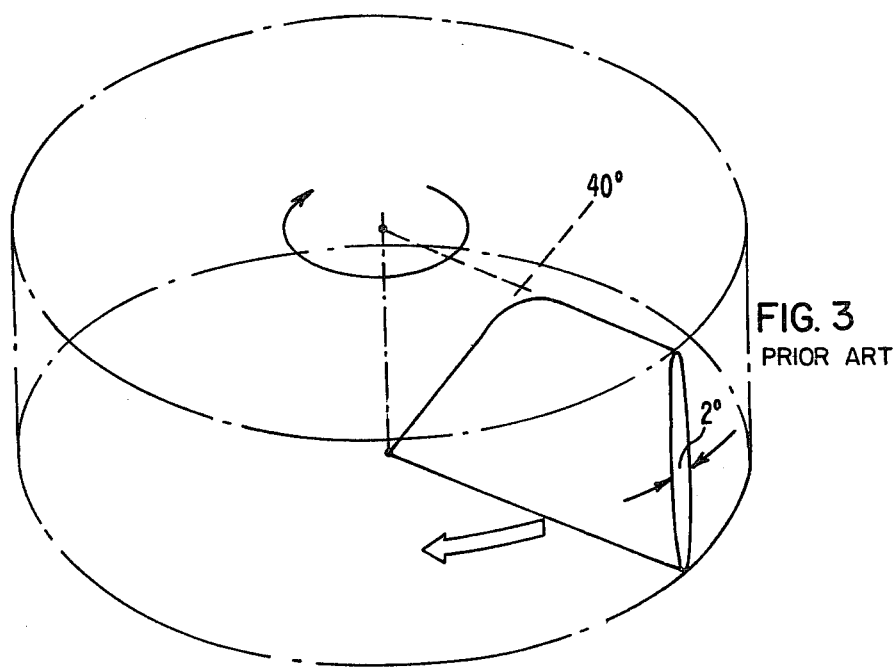
FIG. 3 PRIOR ART

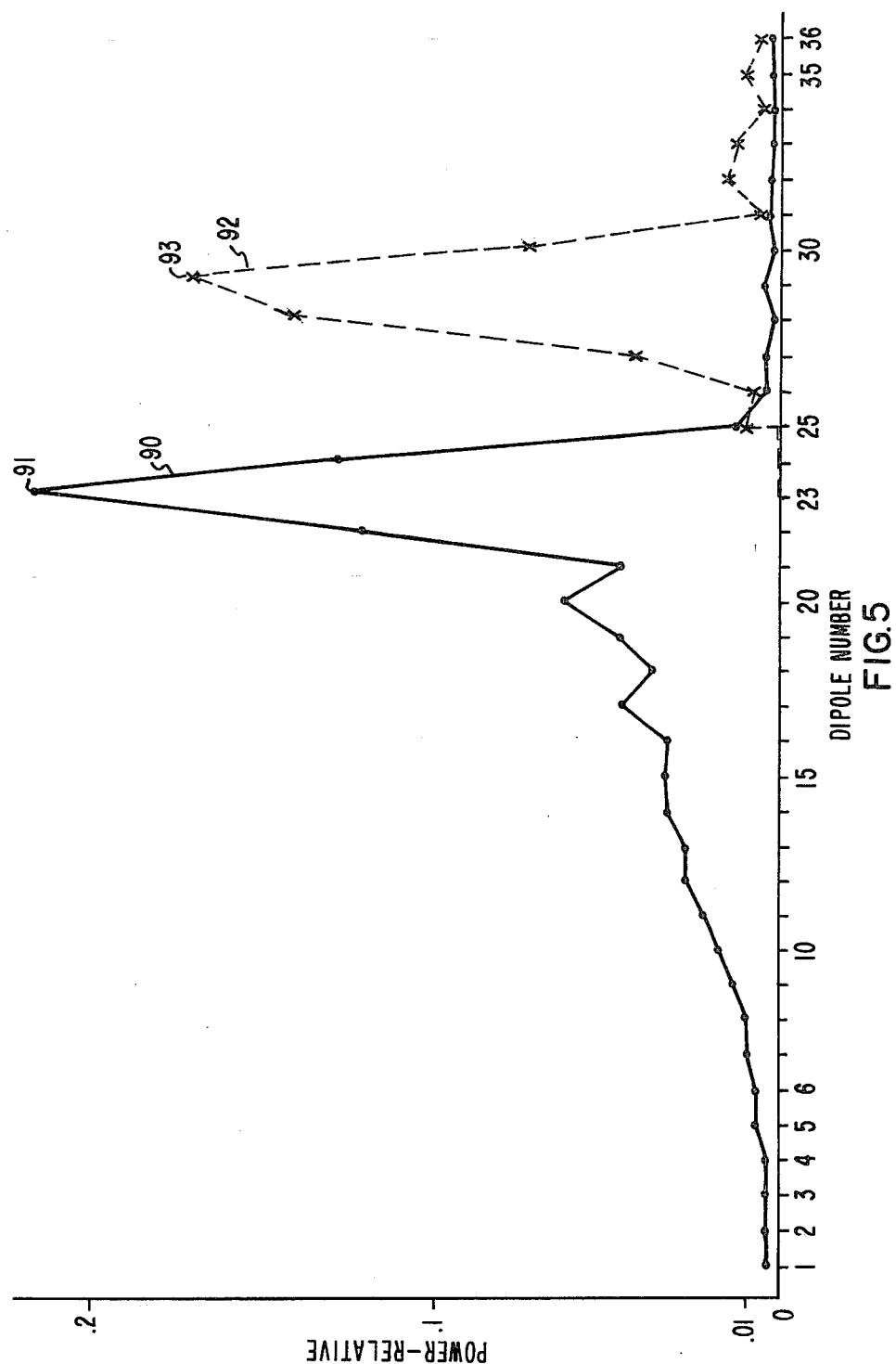

ARRAY MODIFICATION THAT ADDS HEIGHT CAPABILITY TO A 2D ARRAY RADAR

BACKGROUND OF THE INVENTION

The invention relates to the field of radar antenna systems, in general, and more particularly to a two beam array radar antenna system having illumination characteristics for providing amplitude and phase differences between the two beams which when taken together uniquely and accurately identify the height of a detected target.

Radar antenna systems have traditionally been classified into one of either a two dimensional or three dimensional type. The two dimensional radar antenna systems are typically simple and obtain range-azimuth information by generating a fan beam and rotating the fan beam about an azimuth angle. On the other hand, three dimensional radar antenna systems are complex and obtain range-azimuth-elevation information by generating scanning or multiple pencil beams. Presently, there is a growing demand for an intermediate type of antenna system that is basically two dimensional in nature, but has the capabilities of providing approximate elevation information. Some examples of where these intermediate systems may be used are: for classifying high versus low flying threats, for air borne versus surface targets; for directing interceptors that have their own radar; for correcting fan beams' azimuth in the presence of roll and pitch; and for correcting azimuth on antennas with skewed elevation beams. In most of these cases, the expense of using a conventional three-dimensional radar antenna system is not justified.

One known proposed radar antenna system for obtaining height information utilizes illumination characteristics of two beams in a shaped reflector to provide height information comparable to a four beam system. This proposed system comprises a dual feed horn driven shaped reflector type antenna for providing the desired illumination characteristics. In this system, the two formed beams have characteristics which not only provide an amplitude difference therebetween which may be used to determine the height of the target, but they also have a phase difference which when taken together with the amplitude difference yields relatively accurate height information of a detected target in the lower elevation angles and longest range generally where accuracy is most needed. The phase variation of the formed beams comes primarily from the predetermined shape of the reflector, more or less naturally.

However, as with simple feed horn driven reflector type radar antennas, the problems connected with illuminating the ground to produce ground clutter and ground reflection interference still remain. That is, since the beam can't be made with square corners, the simple feed horn radars have limited rate at which the shape of the beam may be cut off. Consequently, some of the generated power illuminates the ground and generates returns from ground obstacles, such as buildings and trees, for example; and some of these ground returns bounce up in the air and interfere with direct returns causing false or inaccurate information, at times.

To improve upon these conventional simple feed horn radar antenna systems, parabolic cylinder reflector antennas were designed and fed by a linear array of feed horns, say 30-40 feed horns, for example. The linear array is normally driven by a power divider wherein the power is distributed across the aperture to provide a sharp cutoff in the fan beam to reduce the ground undercut of the beam. It is understood that the same sharp cut-off in the fan beam may be achieved using a planar or cylindrical array of antenna elements thus eliminating the need for the parabolic cylinder reflector. However, in most cases economic factors dictate, and it is less expensive to build the parabolic reflector than it is to expand the linear array into an area array of radiating elements. A conventional two dimensional surveillance radar antenna of this type generally provides a sharp underside cutoff region of long maximum range coverage which falls off commonly as cosecant squared ($CSC^2$) with elevation above that constant amplitude versus range coverage. In addition, the elevation coverage may span from 20° to 80°, in general, wherein 40° may be considered a typical value. Usually, the linear array/parabolic cylinder reflector or area array radars generate power across the elements of the array in such a fashion that the power is fairly highly concentrated in the middle of the array and has a phase center approximately at the point of maximum power concentration.

To expand the capabilities of these array type radar antenna systems to provide height information as well as azimuth and range information, they must be adapted to generate illumination characteristics of at least two beams. One proposed way of accomplishing this is to provide a beam forming network of microwave couplers, for example, wherein all of the elements in the array are fed with different phases. More specifically, for a two phased beam forming network, a microwave network may be comprised of two inputs wherein one input may feed all of the array elements through the microwave network to effect a certain phase slope across the elements for directing a first beam upward and the second input may feed all the array elements to effect a different phase slope for directing a second beam downward. Thus, the capabilities of a high and low beam are provided. These two beam radar antenna systems are usually unattractive costwise, and, in addition, accuracy is usually limited to a certain fraction of the beamwidth. Probably the best accuracy one might except is one tenth of a beamwidth. That is, out of a 20° elevation beamwidth, for example, accuracy may only be good to within 2°, optimistically. This accuracy limitation may be attributed to the fact that most two beam systems depend primarily on amplitude differences between the two beams to provide the height information of the detected target. They normally don't have phase difference variations because the two phase slopes of the beams are normally generated with respect to the same phase center of the array.

Another way of generating two beams in an array type of radar antenna system is to separate the array elements into two groups, one being used to form a beam upward and the other being driven to form a beam downward. However, in this case, each of the beams will incur a loss of sharpness at the beam cutoff regions. Moreover, each beam may lose approximately half of its power because it is being generated by only half of the array; therefore, both beams are generated at less than full strength with respect to the power capabilities of the overall array antenna system.

From the above, it appears that in each of the proposed radar antenna systems, the adaptation for increasing its capability to provide accurate height information of a detected target has generally resulted in undesirable side effects. Therefore, what appears to be needed is a low cost two dimensional type radar antenna system which may provide, without significant loss of illuminating power, relatively accurate target height information, while maintaining the sharp fan beam cutoff characteristics normally associated with the array type radar antenna systems.

SUMMARY OF THE INVENTION

In accordance with the present invention, a two-dimensional (2D) radar antenna system is operative to form two beams in different directions to achieve illumination characteristics of both phase angle difference and amplitude difference with respect to a common target for deriving the elevation of the target. More specifically, the system includes an array of antenna elements having first and second subarrays with mutually exclusive antenna elements. First and second power divider networks respectively distribute power in the first and second subarrays to compositely form a first beam which has its illuminating power concentrated at a location in the first subarray. A first receiving channel may be driven commonly by both the first and second power divider networks. Furthermore, a third power divider network is coupled to the second power divider network for distributing illuminating power in the second subarray to form a second beam in a direction different from that of the first beam. The illuminating power of the formed second beam is concentrated at a location in the second subarray. Moreover, a second receiving channel may be driven by the third power divider network.

BRIEF DESCRIPTION OF THE DRAWINGS

FIG. 1 depicts a block diagram illustrative schematic of a conventional linear array antenna system;

FIG. 2 is a graph of a typical beam pattern provided by an array antenna system similar to the one shown in FIG. 1;

FIG. 3 is an illustration of the scanning pattern provided by an array antenna system similar to the one shown in FIG. 1;

FIG. 5 is a graph depicting a linear array power distribution suitable for specifying the power divider networks of the embodiment shown in FIG. 4;

DESCRIPTION OF THE PREFERRED EMBODIMENT

Figure 4:
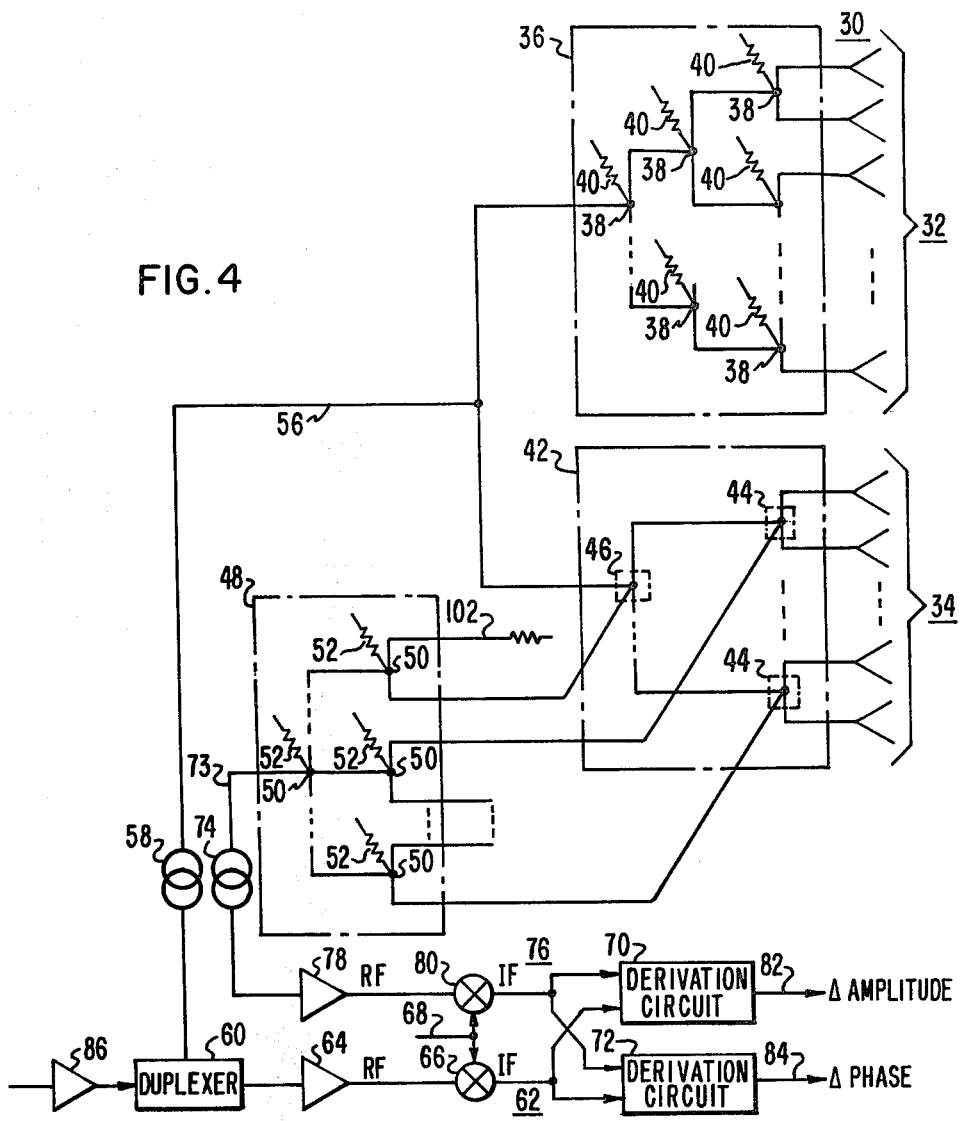
FIG. 4 is a block diagram schematic of an array antenna system suitable for embodying the principles of the present invention.

In connection with the FIGS. 1, 2, and 3, it is intended to first describe a conventional 2D surveillance radar antenna system and thereafter, in contrast therewith, to describe the inventive features of the present invention in connection with the embodiments depicted in FIGS. 4 through 9.

In FIG. 1 is shown a parabolic cylinder reflector 10 fed by a linear array 12 of antenna elements which may be comprised of 30 to 40 feedhorns, for example. The linear array 12 may be driven by a power divider 14 generally made up of an arrangement of microwave couplers in a fashion well known to those skilled in the pertinent art. A transmitting signal may be generated through a transmitting channel 16 and passed through a conventional duplexer 18 and rotary joint 20 to drive the power divider 14 which distributes the power in some predefined manner across the linear array aperture of elements at 12. In a similar manner, the illuminating signal of the radar antenna may be passed through the power divider 14, rotary joint 20, and duplexer 18 to a conventional receiver channel 22.

These parabolic cylinder reflector/linear array type antenna systems are generally used to shape the beam of the antenna to have a sharp underside so as to minimize ground clutter and interference due to ground reflections. Typically, a planar slice of the formed beam pattern may appear as shown in FIG. 2. Usually, the elevation beam coverage of these antenna systems may be say from 0° to 20°, 30° or even 40° elevation. Normally, these antenna systems are required to have maximum range at low elevations and as the beam goes further up in elevation, where targets are unlikely to be, its amplitude may fall off with elevation. Generally, beams formed by the parabolic reflector/linear array type of antenna systems have a sharp underside cutoff region of long maximum range coverage which falls off commonly as a function of cosecant squared with elevation. In some cases, the power divider 14 of the antenna system may have a microwave coupler configuration to effect a distribution of power across the linear array aperture 12 which has power concentrated at the center of the array and in addition, as is commonly the case, the phase center of the beam is naturally located at that point of maximum power concentration.

While the description heretofore has been in connection with conventional parabolic reflector/linear or cylindrical array type antenna systems, it is understood that a planar array antenna system may equivalently be used to form beams of the type shown in FIG. 2. Both types of antenna systems are typically utilized in scanning applications wherein a beamwidth of say 1° or 2°, for example, may be scanned about a predetermined angle in space to cover, a cylindrical region of space or a portion thereof, with a conical section omitted from its center region. A typical illustration of the scanning beam coverage of a 2D surveillance radar antenna system is shown in FIG. 3.

With regard to the present invention, it has been recognized that having two beams formed and displaced apart in space may provide an illumination function exhibiting an amplitude variation between the beams with respect to the elevation of a detected target. However, merely having formed the two beams displaced apart in space does not necessarily provide for a phase angle variation therebetween because the beams are normally formed from the same phase center. It has been additionally recognized that a normal shaped beam, like that shown in FIG. 2, for example, may be generally formed from the concentration of power in one location of the array of antenna elements. With this in mind, it has been discovered that another beam may be added with its concentration of power and phase center formed in a different location than that of the first beam in the antenna array. In fact, the second beam may need only a fraction of the full array aperture to operate satisfactorily since the elevation beam is directed above the ground so that it doesn't have to worry about illuminating the ground. Thus, only a fraction of the array may be shared between the two beams to accomplish first a spatial separation of the two phase centers of the two beams which effects different phase characteristics of the two beams with respect to elevation to provide for a phase angle difference function with elevation and secondly, with the two regions of power concentration points separate, it is considered much easier and less costly to build a microwave power divider network to losslessly supply the two beam illumination characteristics having both an amplitude difference and a phase angle difference function with respect to elevation.

In contrast, if the two proposed beams were formed from concentrations of power in the same spot physically in the array, a sophisticated orthogonal beam forming network, which is quite complex physically and expensive, may be needed in order to form the two beams from the same antenna with equivalent characteristics. That is, the two power divider networks would have to interact with the antenna elements in a very complicated fashion. However, if it could be arranged that one beam has a power concentration in one part of the antenna array and another beam has its power concentration in a second part of the array, a virtually lossless array antenna system may be built, as will be described in greater detail herebelow, with a much simpler and inexpensive power divider network combination.

In accordance with applicant's invention then, the elements of an array aperture may be shared by at least two power dividers, with low loss, due primarily from the way in which the power dividers are arranged. It has been recognized that there are two situations in which loss is not significantly encountered when sharing the elements of the array aperture between two inputs for forming two beams, for example. The first is if beams are aimed in different directions they are not likely to interact and can be formed substantially separately without loss, and secondly if beams are formed with their concentrations of power in two different locations of the array, they are in effect made independent spatially yielding no substantial loss. With this in mind, applicant's preferred embodiment will now be described in connection with FIG. 4.

Referring to FIG. 4, a linear array of antenna elements 30 may be comprised of a upper first subarray 32 and a lower second subarray denoted by 34. For the preferred embodiment, the first subarray 32 may include two thirds of the antenna elements of the linear array and the second subarray 34 may include one third of the antenna elements of the linear array 30. Coupled to the first subarray of antenna elements 32 may be a power divider 36, preferably comprised of an arrangement of microwave couplers, shown at 38, arranged in a conventional fashion. For isolation purposes the microwave couplers 38 of 36 may be of a four-port variety having an isolation port terminated as denoted by the resistors 40.

A second power divider 42 may be coupled to the second subarray of antenna elements 34. Similar to the power divider 36, the power divider 42 may be comprised of a Butler matrix type arrangement of four-port microwave couplers, each coupler having an input port, a terminating port, and two output ports as is conventionally the case. A first portion of the microwave couplers denoted by 44 in the power divider 42 may have their two output ports coupled to a corresponding pair of antenna elements in the second subarray 34. A second portion of microwave couplers denoted by 46 in the power divider network 42 may have their output ports coupled to the input ports of the first portion of microwave couplers 44 to provide for interconnection therebetween in accordance with the desired microwave coupler arrangement. In contrast with the first power divider 36, the second power divider 42 may have its terminating ports coupled to the outputs of a third power divider network 48. The network 48 may also be comprised of a conventional arrangement of microwave couplers, denoted by 50, which may be for the present embodiment similar to the arrangement of the power divider network 36, for example. However, instead of the outputs coupled directly to antenna elements, they are coupled to the other power divider network 42 for sharing the power distribution to the second subarray of antenna elements 34. The microwave couplers 50 of divider network 48 may also have terminations as shown at 52 for isolation purposes.

A common signal line 56 may be coupled to both the inputs of the power divider networks 36 and 42 from a first rotary joint 58 and duplexer 60. A first receiving channel 62 may be coupled to the duplexer 60 for receiving compositely the illuminating signals from the first and second subarrays, 32 and 34, respectively. The first receiving channel may include a RF receiving preamplifier 64 and a conventional mixer 66 in cascade therewith. A signal 68, generally provided from a master oscillator (not shown), may be mixed with the received RF signal in the mixer 66 to form an IF signal therefrom, maintaining substantially the amplitude and phase angle characteristics thereof, which may be passed downstream to one input of each an amplitude difference derivation circuit 70 and a phase angle difference derivation circuit 72.

Similarly, the input of the power divider network 48, signal line 73, may be coupled through a rotary joint 74 into a second receiving channel denoted as 76. The second receiving channel 76 may also include an RF preamplifier 78 and a mixer 80 in cascade therewith. The master oscillator signal 68 may be also coupled to the mixer 80 of the second receiving channel 76 to convert the received RF signal to IF again without destroying substantially the amplitude and phase angle characteristics thereof. The IF signal of the second receiving channel 76 may be coupled to a second input of the circuits 70 and 72. In a conventional manner then the circuitry 70 may be utilized to derive the difference in amplitude from the illuminating signals, received from a common target, in the first and second receiving channels 62 and 76, respectively. Likewise, the circuitry 72 may be utilized to derive the difference in phase angle from the same two illuminating signals.

Figure 9:
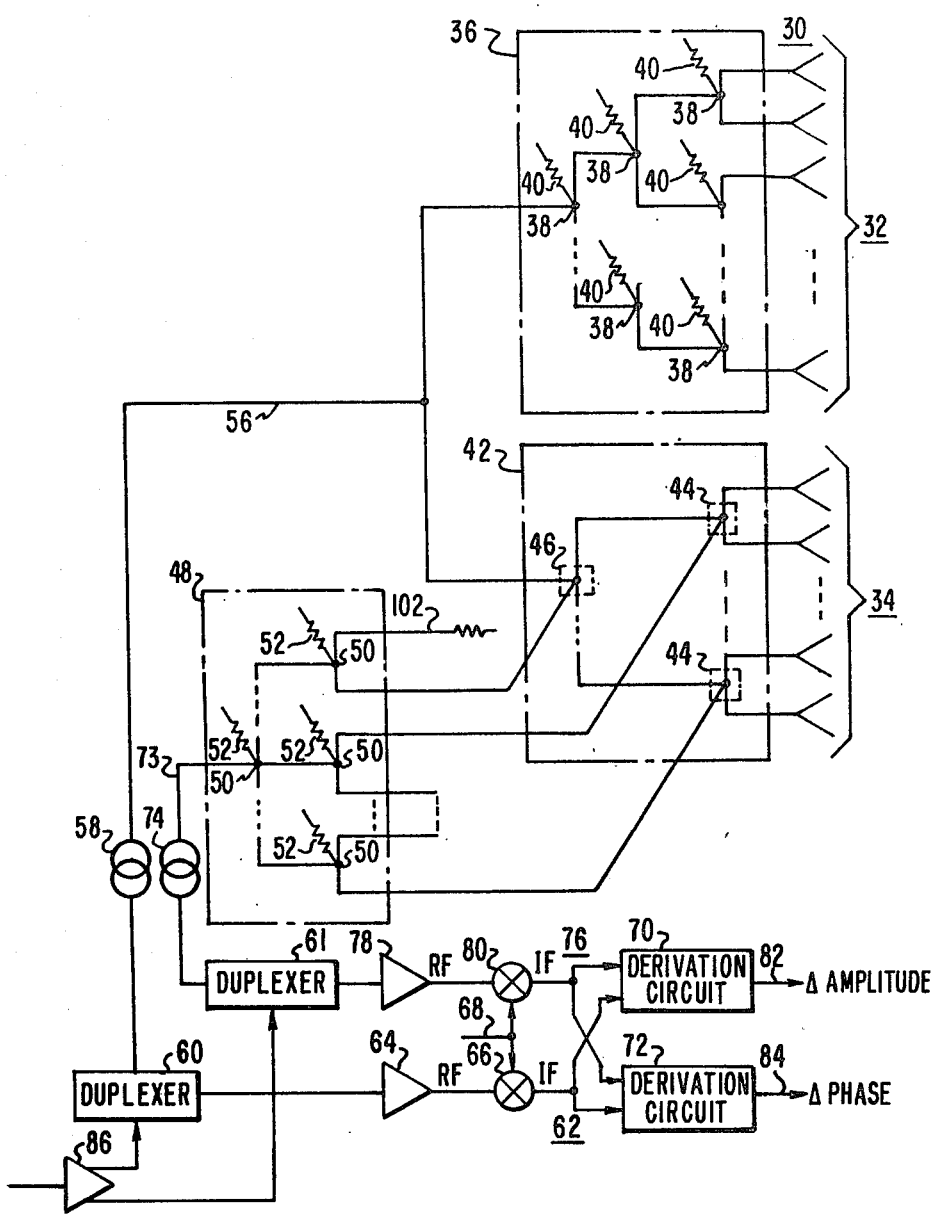
FIG. 9 is illustrative of an alternate embodiment of the antenna system depicted in FIG. 4.

With regard to the embodiment of FIG. 4, a transmitting channel 86 may also be disposed in the antenna system to drive the elements of the linear array 30 through the duplexer 60 and rotary joint 58 utilizing only the power divider networks 36 and 42. It is understood that an alternate embodiment may also be used without deviating from applicant's inventive principles by using the transmitting channel 86 to drive the power divider networks 36 and 42 commonly using signal line 56 and also to drive the power divider network 48 using signal line 73. To accomplish this, another duplexer 61 may be disposed in the line coupling the rotary joints 74 and RF preamplifier 78 having its transmitting input coupled to the transmitting channel 86 and its receiving input coupled to the RF amplifier 78. This alternate embodiment is depicted in FIG. 9.

In more specific detail, the characteristic values of the microwave couplers and interconnections therebetween in the arrangements of the power dividers 36 and 42 may be selected such that the power distribution across the aperture of the linear array 30, which may be a 36 element array, for example, has a power concentration location in the first subarray 32. An example of such desired power distribution is shown by the solid line 90 in graph of FIG. 5. Note that the peak of the power concentration at 91 of the curve 90 is located primarily in the region of the array element 23 in the first subarray 32, and in addition, that an insignificant amount of power is distributed to the second subarray of antenna elements 34, that is, from antenna elements numbered 25 to 36. Moreover, the characteristic values of the arrangement of microwave couplers and interconnections therebetween in the power divider 48 may be chosen such that the concentration of power of a second beam may be located in the second subarray of antenna element 34. An example of the power distribution expected from the chosen characteristic values of the microwave couplers of the power divider 48 is shown by the dashed line curve 92 in the graph of FIG. 5. Note that the peak at 93 of the power concentration of the second beam falls around the region of the antenna element numbered 29 in the second subarray 34.

Figure 6:
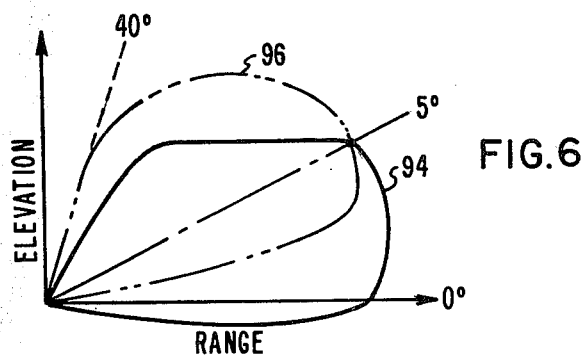
FIG. 6 is a graph illustrating a typical two beam pattern provided by the embodiment of FIG. 4.

Consequently, the characteristic values chosen for the microwave coupler configurations of the power divider networks 36, 42 and 48, in combination, may be specified to form a lower and upper beam much as illustratively shown in FIG. 6. Note that the lower beam denoted by the solid line 94 in FIG. 6 exhibits very little ground undercutting and the formed upper beam, as exemplified by the dashed line 96 in FIG. 6, is raised above the ground thus avoiding any ground undercut problems. Accordingly, the shape of the upper second beam 96 need not have the restrictions associated with the shape of the first lower beam 94 because it is not expected to illuminate any ground regions in its path.

Figure 7:
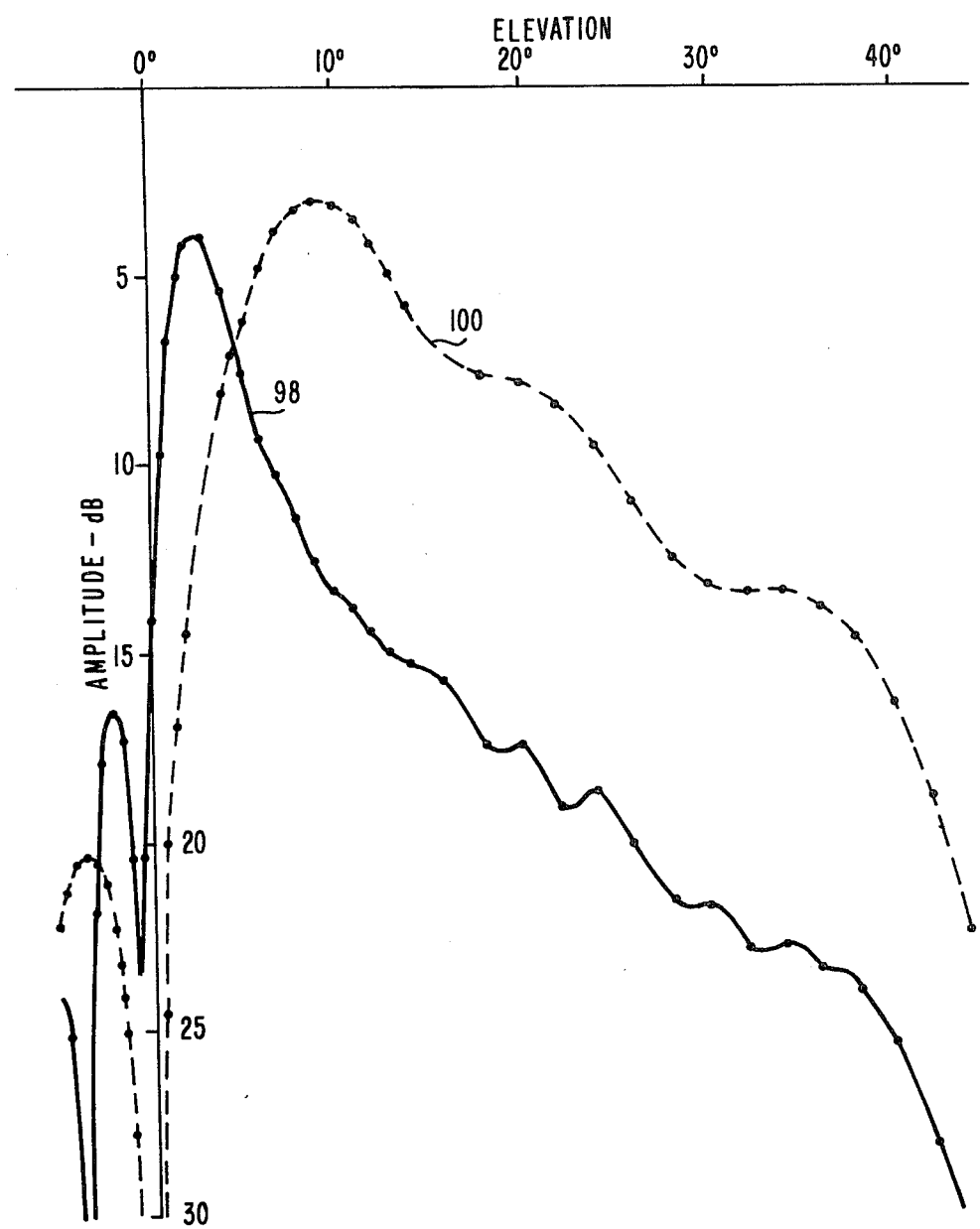
FIG. 7 is a graph depicting an amplitude variation pattern vs. elevation for each of two beams, both of which being suitable for further specifying the power divider networks of the embodiment of FIG. 4.

In greater detail, the curves 98 and 100 of the graph of FIG. 7 exhibit the amplitude variation versus elevation characteristics of the two formed beams, as illustratively displayed in the graph of FIG. 6. Typical of that which may be specified for the lower first beam formed by the power divider networks 36 and 42 is shown by the solid line 98 in the graph of FIG. 7 and the dashed line 100 typifies the amplitude characteristics of the second upper beam as determined primarily by the power divider 48.

Thus the principles of the present invention make use of both having the two beams aimed in different directions and having both beams formed from power concentrations in two different locations of the antenna array whereby the beams do not interact substantially and thus may be formed separately without significant loss. This may not be entirely apparent especially from the illustration of the graph in FIG. 6 wherein the formed low and high beams are depicted as largely overlapping. However, it should be considered that the lower first beam, illustrated by the solid line 94, may be formed by having both its power concentration and phase center in the upper two thirds of the linear array 30 and that the upper second beam, denoted by the dashed line 96, may be formed by having both its power concentration and phase center in the lower one third of the linear array 30. Therefore, even though the beams appear to largely overlap, spatially, the two beams are formed in separate parts of the linear array. In addition, energy radiated from the second subarray of antenna elements 34 largely goes into forming the main part of the second upper beam which goes in a different direction then the first lower beam. Since the two beams are formed in different directions, it is possible to form them independently from the combination of power divider networks shown in the embodiment of FIG. 4. If the two beams are not formed totally independent, as the case may be in practice, then it may be necessary for the second upper beam to feed a small fraction of its power into the signal line 56. In practice it may be desirable to have a terminating port like that shown at 102 for the power divider network 48 as a means of combining these two signals to achieve the desired power distribution requirements for the formation of the second upper beam.

From the amplitude variation differences in the two beams formed by the embodiments described in connection with FIGS. 4 and 9 and as illustratively exhibited by the curves 98 and 100 in FIG. 7, an amplitude difference pattern may be derived with respect to the elevation angle of a detected target. Such an amplitude difference pattern is exemplified by the curve 104 in FIG. 8A. It is understood that amplitude difference patterns of the type as exhibited in FIG. 8A may result from the formation of two beams having different spatial directions even though both beams may be formed from the same power concentration point in an array. However, the present invention not only forms two beams in different directions, but provides for their power concentration points to be separated in the linear array of antenna elements thus achieving two phase centers as well.

Figure 8A:
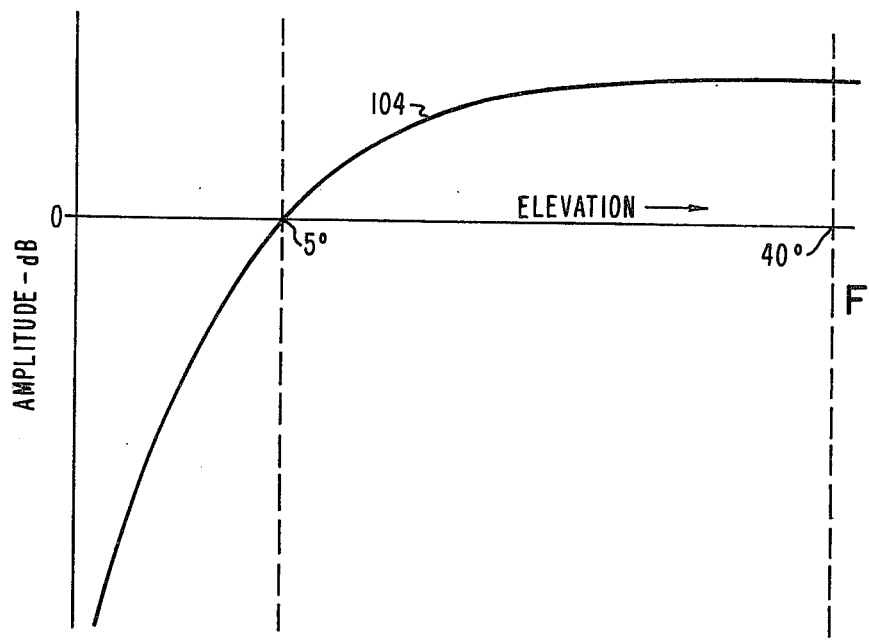
FIGS. 8A and 8B exhibit exemplary amplitude difference vs. elevation and phase angle difference vs. elevation patterns, respectively, which may characterize the two beam operation of the array antenna system of FIG. 4.
Figure 8B:
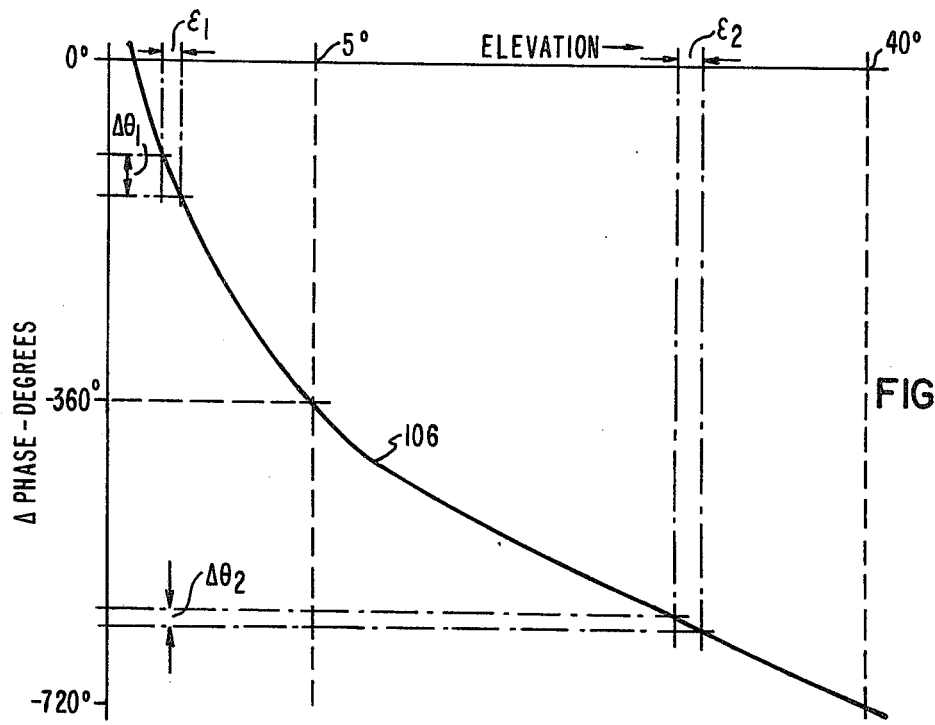

Resulting from the two different phase center locations in the array, the phase angle variations with elevation of the two beams may exhibit different phase angle patterns much the same as the amplitude variation patterns 98 and 100 as depicted in the graph of FIG. 7. Consequently, a phase difference pattern with respect to elevation may additionally be derived in accordance with the characteristic values of the power divider networks 36, 42 and 48, in combination. For the purposes of the present embodiment, a phase angle difference vs. elevation pattern is preferably specified by the curve 106 in the graph of FIG. 8B. Note that the phase angle difference pattern 106 includes a phase angle difference span of 720° covering the measurable elevation angle of the radar, say 40° elevation, for example. The characteristics of the phase angle difference curve 106 may be made such that for a fixed elevation angle increment, a respectively corresponding phase angle difference is larger at lower elevation angles and long range than at higher elevation angles and short range. For example, for the elevation angle increment $\epsilon_1$, a corresponding phase angle difference may be $\Delta\theta_1$ at low elevation angles and similarly, for the same fixed elevation angle $\epsilon_2$, a corresponding phase angle difference $\Delta\theta_2$ results as shown in FIG. 8B. Therefore, in the regions of low elevation and long range, that is, say from 0° to 5° elevation, for the present example, the resolution of the phase angle difference pattern 106 is much greater than at the high angle, short range region above say 5°, for the present example, for a given elevation angle measurement.

In the example of FIG. 8B, the low elevation angle range of 0° to 5° may be covered with a phase angle difference range of 0° to 360°. Likewise, the range from say 5° to 40° of elevation angle may be covered by the phase angle difference of 360° to 720°. Therefore, in measuring the elevation angle of a detected target using only the phase angle difference between the illuminating signals of the first and second receiving channels, an ambiguity may arise. For example, for a phase angle difference reading of approximately 155°, a set of corresponding elevation angles of approximately 2° and 20° may be determined by the phase angle difference pattern 106 in the graph of FIG. 8B. In the present embodiment, to resolve this ambiguity in elevation angle measurement, the amplitude difference pattern 104 as shown in FIG. 8A may be designed to be monotonic in value. Accordingly, the amplitude difference reading may be combined with the phase angle difference reading to provide a unique measurement of the elevation angle. That is to say for the examples shown in FIGS. 8A and 8B, if the amplitude difference reading is below 0 db the elevation angle measurement should be below 5° and similarly, if the amplitude difference reading is greater than 0 db the elevation reading should be greater than 5°.

In operation then, as an illuminating signal from a common target is received by the linear array of antenna elements 30 as shown in FIG. 4 or FIG. 9, it may be passed through the power divider networks 36 ad 42 with an appropriate amplitude and relative phase angle. The resulting signal from the power divider networks 36 and 42 may be passed over the common signal line 56 through the rotary joint 58, duplexer 60 and into the RF amplifier 64 of the first receiving channel 62. Concurrently, the composite illuminating signal from the common target may also pass through the power divider network 42, and then 48 in which is is manipulated to have an appropriate amplitude and relative phase angle. The resulting signal may then be passed through the signal line 73, rotary joint 74 and RF amplifier 78 of the second receiving channel 76. Both of the received signals may be simultaneously converted to their IF signal levels in the respective mixers 66 and 80 utilizing the master oscillator signal 68. Thereafter, the IF signals may be provided to the amplitude and phase angle difference deriving circuits 70 and 72, respectively.

Since by design, the power divider networks 36, 42, and 48, in the present embodiment, may provide for amplitude difference and phase angle difference patterns as typically illustrated by the curves 104 and 106 shown in the graphs of FIGS. 8A and 8B, respectively, it may only be necessary then to compare the phase angle difference value, from signal line 84 with the curve 106 shown in FIG. 8B, for example, to realize a set of two possible elevation angles and then, compare the amplitude difference value, from the signal line 82, to the curve 104 shown in FIG. 8A, for example, to determine which of the two elevation angles may be the correct elevation angle of the target and in addition, to provide a second estimate of the elevation angle thereof. It is understood that azimuth and range measurements of the target may be computed using conventional means. For example, the azimuth may be normally measured by the angle of rotation of the radar with respect to some predetermined rotation angle and the range, of course, may be determined from the times of transmission and reception of the illuminating signals.

While the embodiment described in connection with FIGS. 4 through 9 is one of a parabolic reflector driven by a linear array of antenna elements, it is understood that an antenna system having a planar or cylindrical area array may be equivalently used without deviating from applicant's inventive principles. Thus, applicant's invention should not be limited to any one embodiment, but rather be construed in connection with the broad scope and breadth of the appended claims hereto follow.

What I claim is:

1. A two-dimensional (2D) radar antenna system for forming two beams in different directions to achieve illumination characteristics of both phase angle difference and amplitude difference with respect to a common target for deriving the elevation of said target, said system comprising:
an array of antenna elements including first and second subarrays of antenna elements, said elements of said first and second subarrays being mutually exclusive;
first and second power divider networks for distributing illuminating power in said first and second subarrays, respectively, to compositely form a first beam, the illuminating power of said formed first beam being concentrated at a location in said first subarray of antenna elements;
a first receiving channel driven commonly by both the first and second power divider networks;
a third power divider network, coupled to said second power divider network, for distributing illuminating power in said second subarray of antenna elements to form a second beam in a direction different from that of said first beam, the illuminating power of said formed second beam being concentrated at a location in said second subarray of antenna elements; and
a second receiving channel driven by the third power divider network.

2. The system in accordance with claim 1 including a transmitting channel for driving both the first and second power divider networks.

3. The system in accordance with claim 1 including a transmitting channel for driving, commonly, the first, second, and third power divider networks.

4. The system in accordance with claim 1 wherein the second power divider network comprises an arrangement of four-port microwave couplers, each having a termination port which is included in the coupling means between the second and third power divider networks.

5. The system in accordance with claim 4 wherein the second power divider network includes a first portion of four-port microwave couplers, each coupler having an input port and two output ports which are connected to a corresponding pair of antenna elements in the second subarray; and a second portion of four-port microwave couplers, each having an input port and two output ports for interconnecting with said input ports of the microwave couplers of said first portion and other microwave couplers of said second portion.

6. The system in accordance with claim 1 wherein each of the first, second and third power divider networks include means which are operative, in combination, to effect first and second illuminating signals, from a common target, in the first and second receiving channels, respectively, said first and second signals having both phase angle and amplitude difference patterns therebetween as a function of the elevation angle of the common target.

7. The system in accordance with claim 6 wherein the included means of each of the first, second and third power divider networks comprises means which are operative, in combination, to effect a phase angle difference pattern between the first and second illuminating signals which has, for a fixed elevation angle increment, or respectfully corresponding phase angle difference which is larger at lower elevation angles and long range than at higher elevation angles and short range.

8. The system in accordance with claim 6 wherein the included means of each of the first, second, and third power divider networks comprises means which are operative, in combination, to generate a pattern of phase angle difference which extends from 0° to 720° to cover the corresponding predetermined measurable target elevation angle of the formed first and second beams of the radar and to effect, between the first and second illuminating signals, a monotonic amplitude difference pattern as a function of elevation angle, whereby the monotonic amplitude difference pattern may be used, in combination with the phase angle difference pattern, to resolve any ambiguities in deriving an elevation angle of a target.

9. The system in accordance with claim 1 including a parabolic cylinder reflector; and wherein the array is a linear array of antenna elements.

10. The system in accordance with claim 1 wherein the array is an area array of antenna elements.

* * * * *